Figure 1:
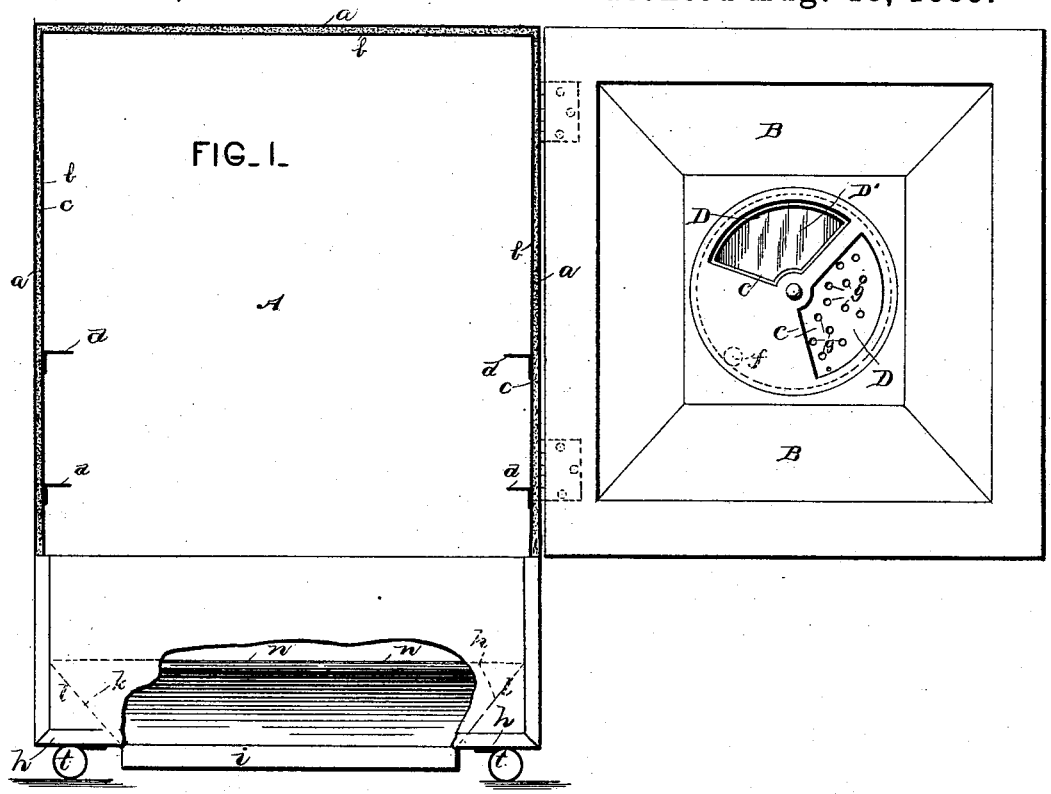

(No Model.) 2 Sheets—Sheet 1.

W. H. ALBACH.
OVEN.

No. 324,448. Patented Aug. 18, 1885.

WITNESSES

INVENTOR
W. H. Albach
ATTORNEY (No Model.) 2 Sheets—Sheet 2.

W. H. ALBACH.
OVEN.

No. 324,448. Patented Aug. 18, 1885.

WITNESSES
Wm. T. Gill
Geo. F. Downing

INVENTOR
W. H. Albach
By H. A. Seymour
ATTORNEY

N. PETERS. Photo-Lithographer, Washington, D. C.

UNITED STATES PATENT OFFICE.

WILLIAM HARRISON ALBACH, OF MANSFIELD, OHIO.

OVEN.

SPECIFICATION forming part of Letters Patent No. 324,448, dated August 18, 1885.

Application filed August 16, 1884. (No model.)

*To all whom it may concern:*

Be it known that I, WILLIAM HARRISON ALBACH, of Mansfield, in the county of Richland and State of Ohio, have invented certain new and useful Improvements in Ovens; and I do hereby declare the following to be a full, clear, and exact description of the invention, such as will enable others skilled in the art to which it appertains to make and use the same.

My invention relates to an improvement in ovens, and more particularly to those designed for use in connection with gas or oil stoves, the object being to so construct the oven that all heat will be directed into the oven and prevent it from being wasted from radiation.

A further object is to provide means whereby the interior of the oven may at any time be examined and ventilated, and, further, to provide a shield for the bottom or side of an oven for the purpose of preventing the food from burning or baking more rapidly on the side or sides toward the parts of the oven which are exposed directly to the flame.

A further object is to provide an oven which shall be simple and economical in construction, and at the same time durable and efficient in use; and with these ends in view my invention consists in providing an oven with an opening in the bottom, and supporting a hopper-shaped heating-chamber therein, the bottom of the oven being provided with perforations leading into the air-space formed between the side of the oven and the walls of the heating-chamber.

My invention further consists in providing an oven with an opening in the bottom, and supporting a hopper-shaped heating-chamber therein, the upper plate of the latter, separating the heating-chamber from the oven, being provided with a series of perforations, and with means for opening or closing said perforations, as desired.

With this end in view my invention consists in a thin sheet of paper or other suitable material prepared with asbestus, and devices for retaining the said sheet at different distances from the bottom or side of the oven.

My invention further consists in a double grate constructed to support the food to be baked, and at the same time hold the shield at different distances from the bottom of the oven.

My invention further consists in providing one of the walls of the oven with two openings, over which is pivoted a disk provided with a series of perforations, and with a glass, mica, or other suitable window, which by turning said disk are brought to register with the openings in the wall.

My invention further consists in certain novel features of construction and combinations of parts, as will be hereinafter described, and pointed out in the claims.

Figure 2:
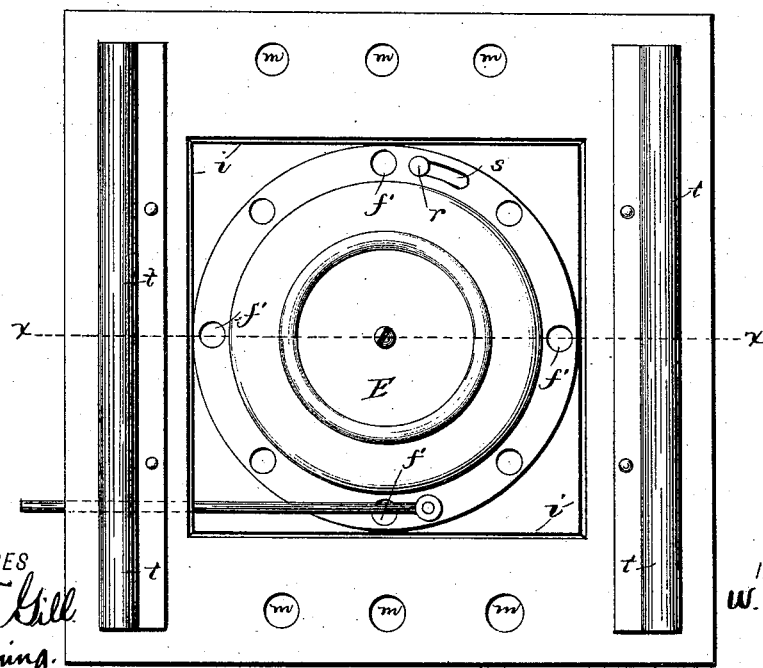
Figure 3:
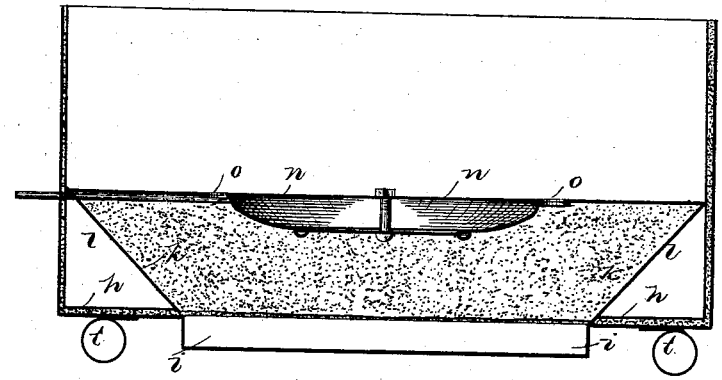
Figure 4:
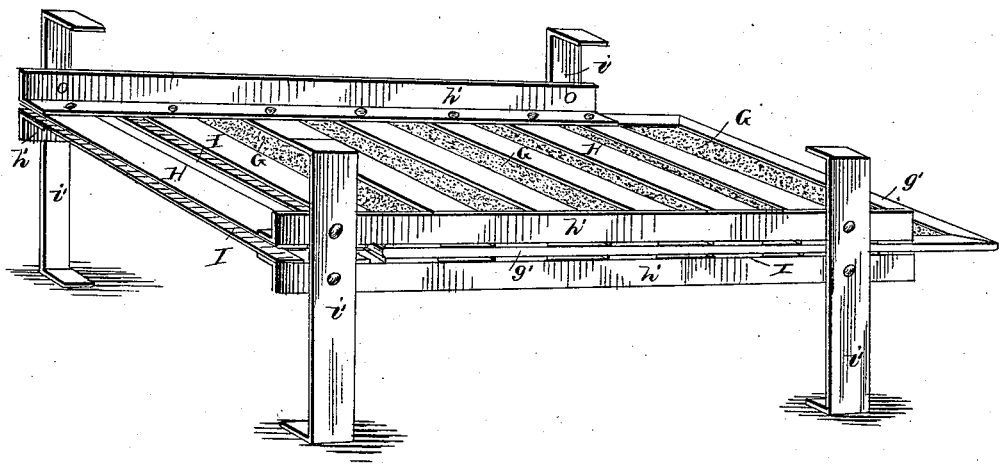

In the accompanying drawings, Figure 1 is a view of my oven with the door open. Fig. 2 is a bottom plan view. Fig. 3 is a sectional view on line *x x* of the heated air-chamber. Fig. 4 is a perspective view of double grate with shield partly pulled out.

A represents the body of the oven, composed of an outer lining, *a*, an inner lining, *b*, and an intermediate layer of asbestus, *c*, the function of the latter being to prevent radiation of heat and to confine it within the oven. The inner lining, *b*, of the oven is provided with ribs *d*, adapted to support trays on which the articles to be baked are placed.

To the body of the oven is secured the door B, and in one of the walls are formed the two openings C C, each equal or nearly equal to one-third of a circle, a strip, *e*, separating the openings.

To the center of the circle from which the openings are cut is pivoted a disk, D, provided with a knob or handle, *f*, by means of which it is turned, the said disk being provided with a series of perforations, *g*, the latter being formed within a space equal in area to one of the openings C, the disk D being also provided with an opening equal in area to one of the openings C, in which is inserted a mica, glass, or other suitable transparent window, D'.

When the oven becomes overheated, the disk D is turned, bringing the perforations *g* opposite one of the openings C, the mica window in this instance registering with the other opening, and when the disk is turned back the window will be opposite the other opening, and thus allow the articles baking to be seen at any time without the necessity of opening the door of the oven, or in any way allowing the heat to escape therefrom.

The bottom $h$ of the oven is provided with a rectangular opening, through which extend the lower straight ends, $i$, of the heated air-chamber, the inclined sides $k$ of the latter bearing on the edges of the opening.

By forming the chamber hopper shape an air-space, $l$, is formed between the sides $k$ and the walls of the oven, the bottom of the oven being provided with perforations $m$, leading into the space between the walls $k$ and the sides of the oven, into which the hot air enters, the said inclined sides of the heated air-chamber being covered on their upper surfaces with asbestus to prevent the escape of heat. The top $n$ of the heated air-chamber is provided with a series of perforations, $o$, formed in a circle, which allow the heated air to pass from the chamber below to the oven above. When one of the burners gets out of order or smokes, these perforations are closed by means of a disk, E, pivoted to the top $n$ of the chamber, and provided with a series of perforations, $f'$.

To the disk is secured a bar, F, which passes through the chamber and out through the wall of the oven. By pulling or pushing on the rod the disk E is turned and the perforations therein brought to register with those in the top of the chamber; or the said latter perforations are closed, according to the direction in which the disk is turned, the movement of the disk being limited by means of a stop or screw, $r$, secured to the top of the chamber, and extending downwardly through an elongated opening, $s$, in the disk E.

Instead of placing the oven directly on the stove, I secure two cylindrical supports or rests, $t$, to the bottom of the oven, which hold the latter above the stove and allow a free circulation of air below the oven for combustion.

G represents a shield, consisting of a sheet of paper or other suitable material provided with a coating of or otherwise prepared with asbestus. The sheet G is made oblong or any other shape to suit the different ovens, and is preferably provided with a sheet-metal binding, $g'$, to prevent wear.

H and I represent oven-grates, of sheet-iron or other suitable metal, provided with lipped edges $h'$, by which the metal strips $i'$ are riveted to the grates, thereby holding said grates a sufficient distance apart to receive the shield G. The metal strips $i'$ project an equal distance below the grates, forming legs which support the grates, and hence the shield, in a horizontal position. The strips $i'$ also project an equal distance above the grates, a distance greater than they extend below, forming legs, when the grate is inverted, which support the grates, and hence the shield, at a greater distance from the bottom of the oven. The ends of the legs are turned inwardly at right angles, thus forming rests which may support the shield, when desired, the thickness of the metal from the bottom of the oven.

When it is desired to protect the food from overheat from the side of the oven, the shield G, either in position between the grates H and I or by itself, can be interposed.

With this simple, convenient, and inexpensive apparatus I am able to prevent any oven from burning bread, cake, or other food, and cause the same to bake evenly fast or slow.

It is evident that slight changes may be made in the construction and arrangement of parts without departing from the spirit and scope of my invention; hence I do not wish to be understood as limiting myself strictly to the construction herein set forth; but, Having fully described my invention, what I claim as new, and desire to secure by Letters Patent, is—

1. The combination, with an oven having an opening in the bottom thereof, of a hot-air chamber secured within said oven and closing the opening in the bottom thereof, and provided with an open bottom and perforated top, and a movable plate for closing the perforations in said top.

2. The combination, with an oven provided with an opening and with perforations in its bottom, of a hopper-shaped hot-air chamber open at its bottom and seated within the opening in the bottom of the oven, and forming a hot-air space between said chamber and the sides of the oven, the said hot-air chamber being provided with openings in the top and a plate for closing the openings, substantially as set forth.

3. The combination, with an oven having two openings located side by side in one wall thereof, of a disk secured to said wall and provided with a perforated section and with an opening having a transparent plate therein, the perforated portion and transparent plate of the disk corresponding in shape to the openings in the wall, substantially as set forth.

4. The combination, with an oven-wall provided with two openings located side by side, of a plate pivoted to said wall, having a solid or imperforate portion, a perforated portion, and an opening covered by a transparent plate, whereby either one of the openings in the oven-wall can be covered or concealed while the transparent portion of the plate covers the other, substantially as set forth.

5. In an oven, the combination, with a grate provided with two sets of legs of different lengths, of a shield coated with asbestus, substantially as set forth.

6. In an oven, the combination, with a double grate, of a shield coated with asbestus, constructed to be held between the sections of the double grate, for the purpose substantially as set forth.

7. In an oven, the combination, with a double grate provided with two sets of legs of different lengths, of a shield constructed to be supported between the sections of the grate, substantially as set forth.

8. In an oven, the combination, with a shield consisting of paper prepared with asbestus and bound with sheet metal, of devices for holding the shield at different distances from the bottom and sides of the oven, substantially as set forth.

In testimony whereof I have signed this specification in the presence of two subscribing witnesses.

W. HARRISON ALBACH.

Witnesses:
GEO. W. STATLER,
C. W. LATIMER.